United States Patent [19] [11] 4,363,847
Hargreaves et al. [45] Dec. 14, 1982

[54] FLEXIBLE SHEET MATERIAL

[75] Inventors: Brian Hargreaves, Manchester; Alan K. Cousens, Cambridge, both of England

[73] Assignee: AMFU Limited, Manchester, England

[21] Appl. No.: 279,611

[22] Filed: Jul. 1, 1981

[30] Foreign Application Priority Data

Jul. 4, 1980 [GB] United Kingdom ............... 8021923

[51] Int. Cl.³ .......................... B32B 5/16; D04D 1/08
[52] U.S. Cl. .................................. 428/283; 428/288; 428/241; 428/237; 428/451; 428/324; 428/326; 428/331; 428/514; 162/181.6; 277/235 B
[58] Field of Search ............... 428/237, 241, 288, 324, 428/326, 331, 451, 514, 283; 162/181 C

[56] References Cited

U.S. PATENT DOCUMENTS 3,164,486  1/1965  Pezzuto et al. ............... 428/339 X
3,404,061  10/1968 Shane et al. .................. 428/408 X
4,174,990  11/1979 Meister ........................ 428/377 X
4,271,228  6/1981  Foster et al. ................. 428/237 X

FOREIGN PATENT DOCUMENTS 1004775  4/1952  France .
1065643  5/1954  France .
 848936  9/1960  United Kingdom .
1023425  3/1966  United Kingdom .
1169370  11/1969 United Kingdom .
1357130  6/1974  United Kingdom .
1430476  3/1976  United Kingdom .
1513808  6/1978  United Kingdom .
2037343  7/1980  United Kingdom .

*Primary Examiner*—P. Ives
*Attorney, Agent, or Firm*—Cushman, Darby & Cushman

[57] ABSTRACT

Flexible sheet material suitable for use in the manufacture of gaskets has a basis (85–95% by weight) of fine particles of a non-fibrous charged-layer-silicate mineral such as chlorite and includes a minor proportion (at least 2% but not more than 15% by weight of the material) of organic web-forming fibers, preferably cellulose fibers. The fine particles of the silicate mineral and the web-forming fibers are bound together with a synthetic rubber.

7 Claims, No Drawings

FLEXIBLE SHEET MATERIAL

This invention relates to flexible sheet material suitable for use in the manufacture of gaskets, particularly spiral wound gaskets, which consist of steel V-strip wound spirally with strip formed from flexible sheet material. In such gaskets the sealing surfaces are formed by the alternating edges of the steel strip and the strip of flexible sheet material.

Such material is commonly made of fibers of asbestos (asbestos being a fibrous layer-silicate mineral) bound together with a synthetic rubber, which is usually formed from a latex (an aqueous dispersion of the rubber). The material is made with the use of conventional paper-making machinery such as a Fourdrinier machine, and is in fact often called 'paper'.

The present invention provides flexible sheet material having a non-asbestos base.

According to the invention there is provided non-asbestos flexible sheet material having a basis of fine particles of a non-fibrous charged-layer-silicate mineral and including a minor proportion of organic web-forming fibers, said fine particles and said organic web-forming fibers being bound together with a synthetic rubber; said flexible sheet material being made by a process in which an aqueous slurry of the aforesaid ingredients is progressively dewatered as a layer on a water-permeable conveyor and the dewatered layer is subsequently compressed and dried; said flexible sheet material having said ingredients in the following proportions by dry weight:

| | |
|---|---|
| the silicate mineral | 85-95% |
| the organic web-forming fibers | 2-15% |
| the synthetic rubber | 1-10% |

By the term 'fine particles' we mean: capable of passing a sieve of aperture 250 μm. Preferably at least 75% by weight of the particulate non-fibrous charged-layer-silicate mineral present should meet this specification.

The non-fibrous charged-layer-silicate mineral employed may be a mica or, preferably, a chlorite. The micas are well known: they have structures in which layers of infinite two dimensional negatively charged ions are cemented together by positive ions such as $K^+$. The chlorites have structures containing infinite two dimensional ions of opposite electrical charge, the negatively charged layers having compositions ranging from $[Mg_3(AlSi_3O_{10})(OH)_2]^-$ to $[Mg_2Al(Al_2Si_2O_{10})(OH)_2]^-$, the positively charged layers having the composition $[Mg_2Al(OH)_6]^+$. Such non-fibrous charged-layer-silicate minerals are to be distinguished from non-fibrous layer silicate minerals such as kaolinite, talc and pyrophyllite, where the infinite 2-dimensional layers (e.g. $Al_2(OH)_4Si_2O_5$ in kaolinite) are uncharged.

The function of the organic web-forming fibers is partly to enable the sheet material to be made on conventional paper-making machinery, that is to say, by a process in which an aqueous slurry of paper-forming ingredients is progressively dewatered as a layer on a water-permeable conveyor (usually of wire mesh), the dewatered layer being subsequently compressed and dried. Additionally, the web-forming fibers impart strength to the finished paper. Preferably, the organic web-forming fibers are cellulose fibers. They preferably form from 4 to 10% by dry weight of the finished paper.

In the preparation of the aqueous slurry to be dewatered, the fibers are suitably employed at a freeness of 60°-90° Schopper Riegler (°SR).

The synthetic rubber ingredient, which bonds together the fine particles of non-fibrous silicate mineral and the web-forming fibers, is suitably present in an amount forming 1-10%, preferably 1.5-8%, by dry weight of the finished paper. The synthetic rubber is preferably a nitrile rubber, such as an acrylonitrile-butadiene copolymer, suitably of butadiene content 45-65% by weight. In preparing the paper, the synthetic rubber is incorporated in dispersed form in the aqueous slurry which is progressively dewatered, conveniently by the use of a commercially available latex containing a dispersing agent.

The flexible sheet material may contain small proportions of other ingredients, such as carbon fibers of low modulus (i.e. having an elongation at break in tension of 3 to 4%) to impart lubricity or rayon fibers to impart tear strength, in an amount up to 2% by weight. A small proportion of wax may also be included to improve lubricity.

After formation on conventional paper-making machinery, the dry product is preferably calendered (hot or cold) to improve its flexibility and to give it a desired thickness (usually 0.4-2 mm) and density (usually 750-1500 kg/m³).

The invention is further illustrated by the following Examples, which utilize a finely divided chlorite of which 90% by weight passed a sieve of aperture size 250 μm, while less than 1% passed on sieve of aperture 50 μm.

EXAMPLE 1

This Example illustrates the preparation of a paper from chlorite, cellulose fibers and a synthetic rubber in the weight proportions 92:6:2.

A Preparation of Stock i Bleached softwood sulphate pulp (0.3 kg) in sheet form was made into an aqueous slurry of solids content 3% by weight, and treated in a disc refiner until its freeness value was 80° Schopper Riegler (SR).

ii 10 kg of the pulp was added to 91 liters of water at a temperature of 40°-45° C. in a mixing chest and vigorously stirred.

iii 4.6 kg of chlorite were added to the mixing chest followed by a further 91 liters of water at 40°-45° C.

iv Stirring was continued for 5 minutes, and then 0.25 kg of a commercially available aqueous acrylonitrile-butadiene copolymer latex (butadiene content, 55%; particle size, 0.13 μm) of 40% solids content, diluted with 2.5 liters of cold water, was added.

v Stirring was continued for a further 5 minutes.

vi The pH of the stock in the mixer was then reduced to 4 by the addition of papermakers alum (aluminium sulphate). The supernatant liquid that remained when stirring was stopped was clear, indicating that the dispersed rubber particles of the latex had all been precipitated onto the chlorite particles and cellulose fibers.

B Preparation of Paper

The stock (slurry) of A above was made into flexible sheet material in an entirely conventional way on a Fourdrinier flat wire paper machine, such as is described in chapters 10 and 11 of "Paper and Board Manufacture" by Julius Grant, James H. Young, and Barry G. Watson (Publishers; Technical Division, the British Paper and Board Industry Federation, London 1978). The slurry is progressively dewatered as it travels on the water-permeable conveyor of the machine, and the dewatered material is consolidated by pressing between rollers. The sheet material thus formed is dried on heated cylinders, and then calendered.

The properties of various flexible sheet materials obtained from the slurry of A are set out below:

| Product before calendering | | |
|---|---|---|
| Thickness (mm) | 0.90 | |
| Mass/unit area (g/m$^2$) | 775 | |
| Density (kg/m$^3$) | 861 | |
| Tensile Strength (MPa) | | |
| (a) MD (in machine direction) | 2.68 | |
| (b) CD (across machine) | 2.53 | |
| Product after calendering | Cold Calendering | Hot Calendering |
| Thickness (mm) | | |
| (a) Before calendering | 0.84 | 0.88 |
| (b) After calendering | 0.64 | 0.70 |
| Mass/unit area (g/m$^2$) | 719 | 757 |
| Density (kg/m$^3$) | | |
| (a) Before calendering | 856 | 861 |
| (b) After calendering | 1120 | 1064 |
| Tensile Strength (MPa) | | |
| (a) MD | 3.60 | 3.37 |
| (b) CD | 3.26 | 2.89 |

Flexible sheet material made as just described, with hot calendering, was made up into spiral wound gaskets, which were then incorporated in bolted flanged assemblies. These assemblies were subjected to steam under conditions simulating those in high pressure steam lines in normal service. The tests involved thermal cycling with (a) saturated steam at 300° C. and 1150 psi (7.9 MPa), and (b) superheated steam at 540° C. and 1150 psi (7.9 MPa), using in each case 500 cycles between the conditions just given and steam at 98° C. and atmospheric pressure. The assemblies remained steam-tight.

After completion of thermal cycling tests, the assemblies were subjected to hydrostatic water pressure (1500 psi; 10.3 MPa) at ambient temperature for prolonged periods. Again, the assemblies remained fluid-tight.

The assemblies were then dismantled, and a check was made of the capacity of the gaskets to recover from the bolt loading which had been applied to them during the tests. On removal from the flanged joints, the gaskets recovered in thickness from 0.125 inch to 0.135 inch (3.175 to 3.43 mm).

EXAMPLE 2

The procedure of Example 1 was followed generally, with the following differences.
a. The weight proportions of chlorite, cellulose fibers and acrylonitrile-butadiene copolymer were 88:6:6.
b. The solids content of the cellulose pulp slurry was 2.5% by weight, and in preparing the slurry a Hollander beater was used instead of a disc refiner, to obtain a freeness of 76° SR.
c. 48 kg of the refined pulp slurry of (b) was added to 91 liters of water at a temperature of 40°-45° C. in the mixing chest and stirred vigorously.
d. 17.6 kg of chlorite was then added to the mixing chest followed by a further 273 liters of water at 40°-45° C.
e. Stirring was continued for 5 minutes, and then 3 kg of the latex was added, diluted with 30 liters of cold water.

The properties of various flexible sheet materials obtained were as follows:

| Product before calendering | | |
|---|---|---|
| Thickness (mm) | 1.59 | |
| Mass/unit area (g/m$^2$) | 1275 | |
| Density (kg/m$^3$) | 802 | |
| Tensile Strength (MPa) | | |
| (a) MD | 1.37 | |
| (b) CD | 1.13 | |
| Product after calendering | Hot Calendering | Cold Calendering |
| Thickness (mm) | | |
| (a) Before Calendering | 0.88 | 1.07 |
| (b) After Calendering | 0.58 | 0.58 |
| Mass/unit area (g/m$^2$) | 739 | 892 |
| Density (kg/m$^3$) | | |
| (a) Before Calendering | 840 | 834 |
| (b) After Calendering | 1320 | 1431 |
| Tensile Strength (MPa) | | |
| (a) MD | 3.23 | 3.70 |
| (b) CD | 2.43 | 2.90 |

EXAMPLE 3

The procedure of Example 1 was followed generally with the following differences
(a) 20 kg of the refined pulp slurry was added to 91 liters of water at a temperature of 40°-45° C. in the mixing chest and stirred vigorously.
(b) 9.2 kg of chlorite was then added to the mixing chest followed by a further 159 liters of water at 40°-45° C.
(c) Stirring was continued for 5 minutes prior to adding 0.5 kg of the nitrile latex diluted with 5 liters of cold water.

The properties of various flexible sheet materials obtained are set out below:

| | Product before Calendering | Hot-calendered Product |
|---|---|---|
| Thickness (mm) | 0.89 | 0.56 |
| Density (kg/m$^3$) | 770 | 1180 |
| Tensile Strength (MPa) | | |
| (a) MD | 1.25 | 2.03 |
| (b) CD | 0.89 | 1.36 |

I claim:
1. Non-asbestos flexible sheet material having a basis of a major portion of fine particles of a chlorite as a non-fibrous charged-layer-silicate mineral and including a minor proportion of organic web-forming fibers, said fine particles and said organic web-forming fibers being bound together with a synthetic rubber; said flexible sheet material being made by a process in which an aqueous slurry of the aforesaid ingredients is progressively dewatered as a layer on a water-permeable conveyor and the dewatered layer is subsequently compressed and dried, said flexible sheet material having said ingredients in the following proportions by dry weight:

| silicate mineral | 85-95% |
|---|---|
| organic web-forming fibers | 2-15% |
| synthetic rubber | 1-10% |

2. Flexible sheet material according to claim 1, in which the organic web-forming fibers are cellulose fibers.

3. A spiral wound gasket incorporating flexible sheet material according to claim 1.

4. Flexible sheet material according to claim 1 or 2, in which the synthetic rubber is an acrylonitrile-butadiene copolymer.

5. Flexible sheet material according to claim 3 wherein the chlorite, cellulose fibers and acrylonitrile-butadiene copolymer are in weight proportions of 88:6:6.

6. Flexible sheet material according to claim 2 wherein the chlorite, cellulose fibers and a synthetic rubber are in weight proportions of 92:6:2.

7. A spiral wound gasket adapted for use in high pressure steam lines incorporating the flexible sheet material according to claim 2.

* * * * *